United States Patent
Kameyama

(10) Patent No.: US 10,763,476 B2
(45) Date of Patent: Sep. 1, 2020

(54) BATTERY MOUNTING STRUCTURE

(71) Applicant: Toyota Jidosha Kabushiki Kaisha, Toyota-shi, Aichi-ken (JP)

(72) Inventor: Taiki Kameyama, Gamagori (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 16/432,164

(22) Filed: Jun. 5, 2019

(65) Prior Publication Data

US 2019/0379017 A1 Dec. 12, 2019

(30) Foreign Application Priority Data

Jun. 7, 2018 (JP) .................................. 2018-109828

(51) Int. Cl.
*H01M 2/10* (2006.01)
*B60L 50/60* (2019.01)
*B60K 1/04* (2019.01)

(52) U.S. Cl.
CPC ............. *H01M 2/1083* (2013.01); *B60K 1/04* (2013.01); *B60L 50/66* (2019.02)

(58) Field of Classification Search
CPC ... H01M 2/1083; H01M 10/658; B60L 50/66; B60L 3/0007; B60K 1/04; B60K 2001/0416; B60R 16/04
See application file for complete search history.

(56) References Cited

U.S. PATENT DOCUMENTS

| | | | |
|---|---|---|---|
| 5,343,974 A * | 9/1994 | Rabek ................... | B62D 61/08 180/216 |
| 10,322,689 B1* | 6/2019 | Oyama ............... | H01M 2/1005 |
| 2011/0139527 A1* | 6/2011 | Bannier ............. | H01M 2/0262 180/68.5 |
| 2012/0125702 A1* | 5/2012 | Bergfjord ............... | B60L 58/19 180/65.1 |
| 2013/0065099 A1* | 3/2013 | Mishima ............. | H01M 10/613 429/71 |
| 2013/0161105 A1* | 6/2013 | Maguire .................. | B60K 1/04 180/68.5 |
| 2013/0248267 A1* | 9/2013 | Nitawaki ................ | B60L 50/64 180/68.5 |
| 2014/0302362 A1* | 10/2014 | Takizawa ............ | H01M 2/1077 429/83 |
| 2015/0037616 A1* | 2/2015 | Wyatt ............... | H01M 10/0481 429/7 |
| 2015/0060164 A1* | 3/2015 | Wang .................. | H01M 10/613 180/65.21 |

(Continued)

FOREIGN PATENT DOCUMENTS

JP 2002-186101 A 6/2002
JP 2013-026111 A 2/2013

*Primary Examiner* — Erez Gurari
(74) *Attorney, Agent, or Firm* — Dinsmore & Shohl LLP

(57) ABSTRACT

A battery mounting structure has a battery that is placed in a luggage space and that has a positive electric power terminal which protrudes upward near a rear end of the battery, a battery cover that covers at least a part of the battery, a rear pillar that is placed at a boundary between a side surface and a back surface of the vehicle and that has a flange which protrudes to a front side, and an insulating sheet that is attached to the battery cover so as to be positioned between the positive electric power terminal and the flange.

7 Claims, 6 Drawing Sheets

(56) References Cited

U.S. PATENT DOCUMENTS

| | | | |
|---|---|---|---|
| 2015/0069964 A1* | 3/2015 | Kamikihara | B60L 53/65 |
| | | | 320/108 |
| 2015/0273996 A1* | 10/2015 | Onodera | H01M 2/1083 |
| | | | 429/100 |
| 2016/0243948 A1* | 8/2016 | Asai | B60L 53/36 |
| 2018/0015893 A1* | 1/2018 | Ito | H01M 2/1083 |
| 2018/0175350 A1* | 6/2018 | Goitsuka | H01M 2/0262 |
| 2019/0118669 A1* | 4/2019 | Jensen | B60L 50/60 |
| 2019/0118692 A1* | 4/2019 | Qiu | B60L 3/0007 |
| 2019/0393569 A1* | 12/2019 | Rich | B60R 16/033 |

* cited by examiner

BATTERY MOUNTING STRUCTURE

CROSS REFERENCE TO RELATED APPLICATION

This application claims priority to Japanese Patent Application No. 2018-109828 filed on Jun. 7, 2018, which is incorporated herein by reference in its entirety including the specification, claims, drawings, and abstract.

TECHNICAL FIELD

The present disclosure relates to a battery mounting structure for mounting a battery in a luggage space of a vehicle.

BACKGROUND

Among vehicle-mounted batteries, there exist batteries which are placed in a luggage space of a vehicle. For example, an auxiliary machine battery which supplies electric power to an auxiliary machinery of a vehicle is mounted in the luggage space of the vehicle. Many techniques have been proposed in the related art for protecting the battery when the vehicle experiences a large impact, such as when the vehicle collides with other objects.

For example, JP 2002-186101 A discloses an auxiliary machine battery placed at a rear part of a rear wheel arch. In JP 2002-186101 A, in order to protect the auxiliary machine battery when the vehicle collides at the front (front collision), a ventilation duct is placed between the rear wheel arch and the auxiliary machine battery. When such a structure is employed, the collision energy is consumed during the process in which the rear wheel arch moving rearward due to the front collision collapses the ventilation duct, and thus, the collision energy applied to the auxiliary machine battery can be reduced and the auxiliary machine battery can be protected.

However, in JP 2002-186101 A, although the protection of the auxiliary machine battery during the front collision is well taken into consideration, protection of the auxiliary machine battery during a rear collision is not sufficiently considered.

Depending on a vehicle, a flange of a rear pillar may protrude behind the auxiliary machine battery. The rear pillar is made of a metal, including the flange. When the metal flange contacts an electric power terminal of the auxiliary machine battery during the rear collision, short-circuiting occurs. While the periphery of the electric power terminal is covered by a terminal cover made of an insulating material, the terminal cover may be detached due to the impact when the rear pillar collides with the auxiliary machine battery. Thus, in the techniques of the related art, there still remains room for improvement in prevention of short-circuiting of the electric power terminal of the battery during the rear collision of the vehicle.

In light of the above, the present disclosure discloses a battery mounting structure which can prevent short-circuiting of the electric power terminal of the battery during the rear collision of the vehicle.

SUMMARY

According to one aspect of the present disclosure, there is provided a battery mounting structure for mounting a battery in a luggage space of a vehicle, comprising: a battery that is placed in the luggage space and that has a first electric power terminal which protrudes upward near a rear end of the battery; a battery cover that covers at least a part of the battery; a rear pillar that is placed at a boundary between a side surface and a back surface of the vehicle and that has a flange which protrudes to a front side; and an insulating sheet that is attached to the battery cover so as to be positioned between the first electric power terminal and the flange.

By placing the insulating sheet between the first electric power terminal and the flange, even when the flange moves toward the first electric power terminal, direct contact between the flange and the first electric power terminal can be effectively prevented, and consequently, short-circuiting of the first electric power terminal can be effectively prevented.

According to another aspect of the present disclosure, the insulating sheet may be able to deflect in a direction toward a side of the first electric power terminal following movement of the flange when the insulating sheet is pushed by the flange.

With such a structure, the insulating sheet can deform following the flange, and rupturing of the insulating sheet can be effectively prevented. With this configuration, the short-circuiting of the first electric power terminal can be more reliably prevented.

According to another aspect of the present disclosure, the battery cover may comprise a pair of support parts distanced in a horizontal direction, and the insulating sheet may be supported by the pair of the support parts in a state with a marginal length in which a distance along a surface from one end to the other end of the insulating sheet is longer than a straight-line distance between the pair of the support parts.

By providing the marginal length in the insulating sheet, it becomes possible to cause the insulating sheet to follow the flange while suppressing a tensile load applied to the insulating sheet. With this configuration, the rupturing of the insulating sheet can be more reliably prevented, and consequently, the short-circuiting of the first electric power terminal can be more reliably prevented.

According to another aspect of the present disclosure, the distance along the surface from the one end to the other end of the insulating sheet may be greater than or equal to a total distance of a distance from one of the support parts to the first electric power terminal and a distance from the other of the support parts to the first electric power terminal.

With such a structure, it becomes possible to cause the insulting sheet to deflect until the insulating sheet reaches the first electric power terminal, and the short-circuiting of the first electric power terminal can be more reliably prevented.

According to another aspect of the present disclosure, ends of the insulating sheet may be fixed to the pair of the support parts in a state where a part of the insulating sheet is folded, and the folding of the insulating sheet may be released and the insulating sheet may be opened to the side of the first electric power terminal when the insulating sheet is pushed to the side of the first electric power terminal.

With such a structure, the marginal length of the insulating sheet can be reliably secured.

According to another aspect of the present disclosure, at least one of the pair of the support parts may support the insulating sheet in a slidable manner, the insulating sheet may be supported by the pair of the support parts in a state where a part of the insulating sheet is hung outside of the slidable support part, and the insulating sheet may be deflected to the side of the first electric power terminal by the hung portion being slid when the insulating sheet is pushed to the side of the first electric power terminal.

With such a structure, the marginal length of the insulating sheet can be reliably secured.

According to another aspect of the present disclosure, an upper end of the insulating sheet may be higher than an upper end of the first electric power terminal.

With such a structure, the short-circuiting of the flange and the first electric power terminal can be more reliably prevented.

According to the battery mounting structure of the present disclosure, because the insulating sheet is placed between the first electric power terminal and the flange, even when the flange moves to the first electric power terminal, direct contact between the flange and the first electric power terminal can be effectively prevented, and consequently, short-circuiting of the first electric power terminal can be effectively prevented.

BRIEF DESCRIPTION OF DRAWINGS

Embodiment(s) of the present disclosure will be described based on the following figures, wherein.

DESCRIPTION OF EMBODIMENTS

Figure 1:
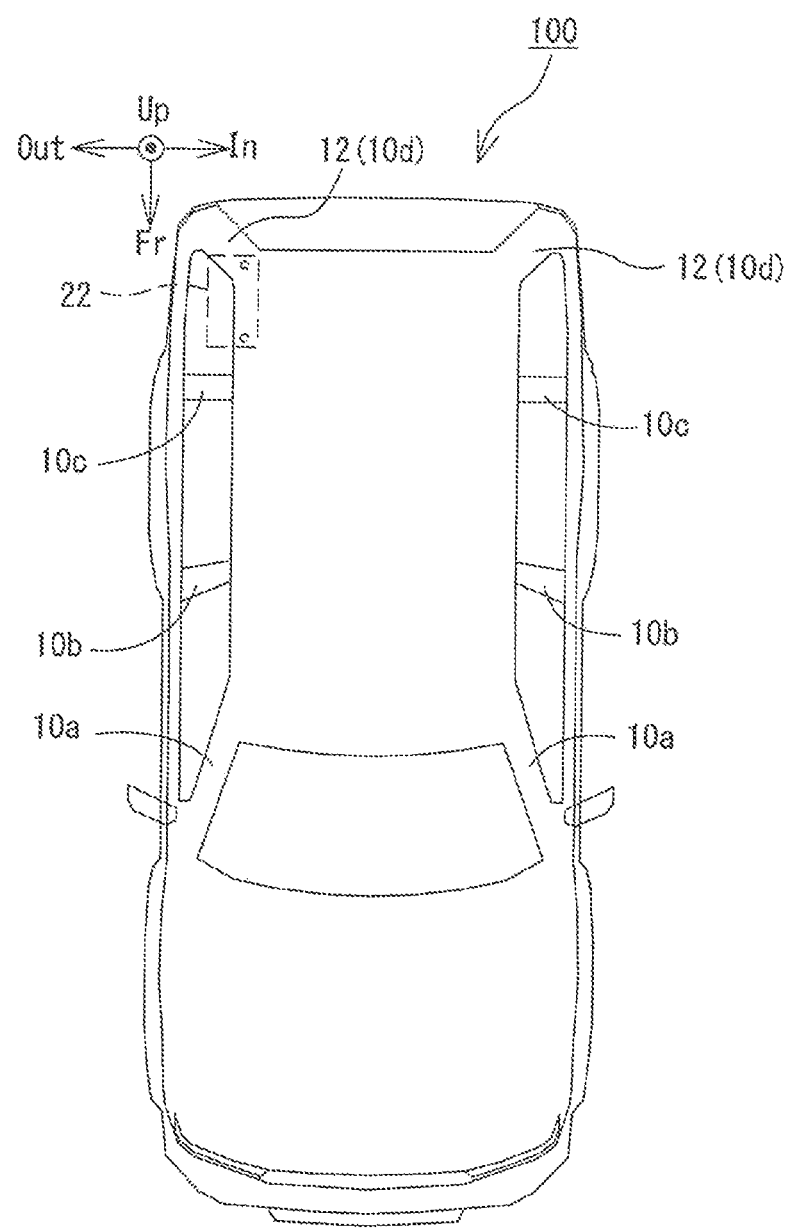
FIG. 1 is a plan view of a vehicle onto which a battery is mounted.
Figure 2:
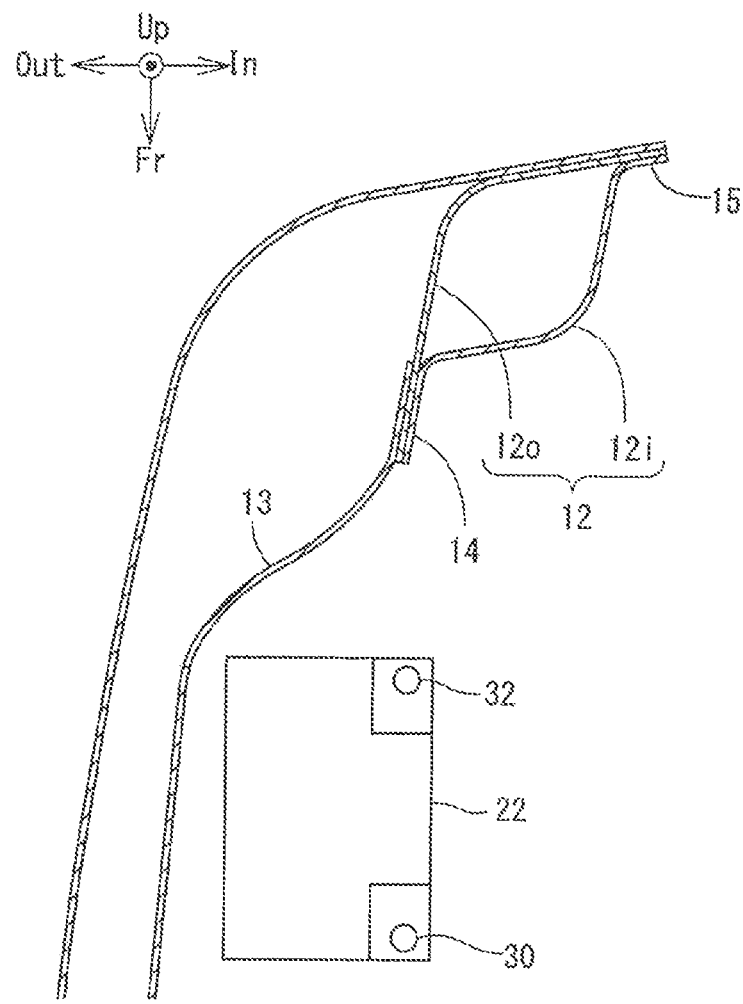
FIG. 2 is a diagram explaining a positional relationship of a battery and a rear pillar

A battery mounting structure will now be described with reference to the drawings. FIG. 1 is a plan view of a vehicle 100 onto which a battery 22 is mounted. FIG. 2 is a diagram explaining a positional relationship of the battery 22 and a rear pillar 12. In the drawings, "Fr" and "Up" represent front and upward directions of the vehicle, respectively, and "In" and "Out" represent an inner side and an outer side in a vehicle width direction, respectively.

The battery 22 functions as a power supply of an auxiliary machinery of the vehicle 100, and is generally called an "auxiliary machine battery". The battery 22 is formed from, for example, a lead-acid storage battery, and an output voltage thereof is about 12V. The battery 22 is combined with a battery cover 24 or the like to be described later, to form a battery unit 20. The battery unit 20 is placed in a luggage space provided at a rear part of the vehicle.

On the vehicle 100, pillars 10a-10d which connect a body and a roof to secure a cabin space are provided. In the present example configuration, four pillars are provided at each of the left and the right, and each pillar is called, in order from the front side of the vehicle, an A pillar 10a, a B pillar 10b, a C pillar 10c, and a D pillar 10d. Of these pillars, the D pillar 10d is the rear pillar 12 positioned at a boundary between a side surface and a back surface of the vehicle 100.

The rear pillar 12 is a member which extends in an up-and-down direction of the vehicle, and is normally formed from a metal. The rear pillar 12 is formed, for example, by joining an outer panel 12o and an inner panel 12i which respectively have an approximate L shape, and has a closed cross section with an approximate quadrangular shape. Locations where an end of the outer panel 12o and an end of the inner panel 12i are overlapped and joined become flanges 14 and 15 having an approximate flat plate shape. One flange 14 protrudes towards the front side of the vehicle, that is, toward the battery 22. To the flange 14, other panel members, for example, a decorative panel 13 forming an inner wall of the luggage space, are further attached.

The battery 22 is placed in the luggage space in front of the rear pillar 12. Further, the battery 22 is provided with two electric power terminals 30 and 32, and is placed in an orientation such that the two electric power terminals 30 and 32 are arranged in the front and the rear. In particular, in the present example configuration, the battery 22 is placed such that the positive electric power terminal 32 is positioned at the rear side of the vehicle and the negative electric power terminal 30 is positioned at the front side of the vehicle.

Figure 3:
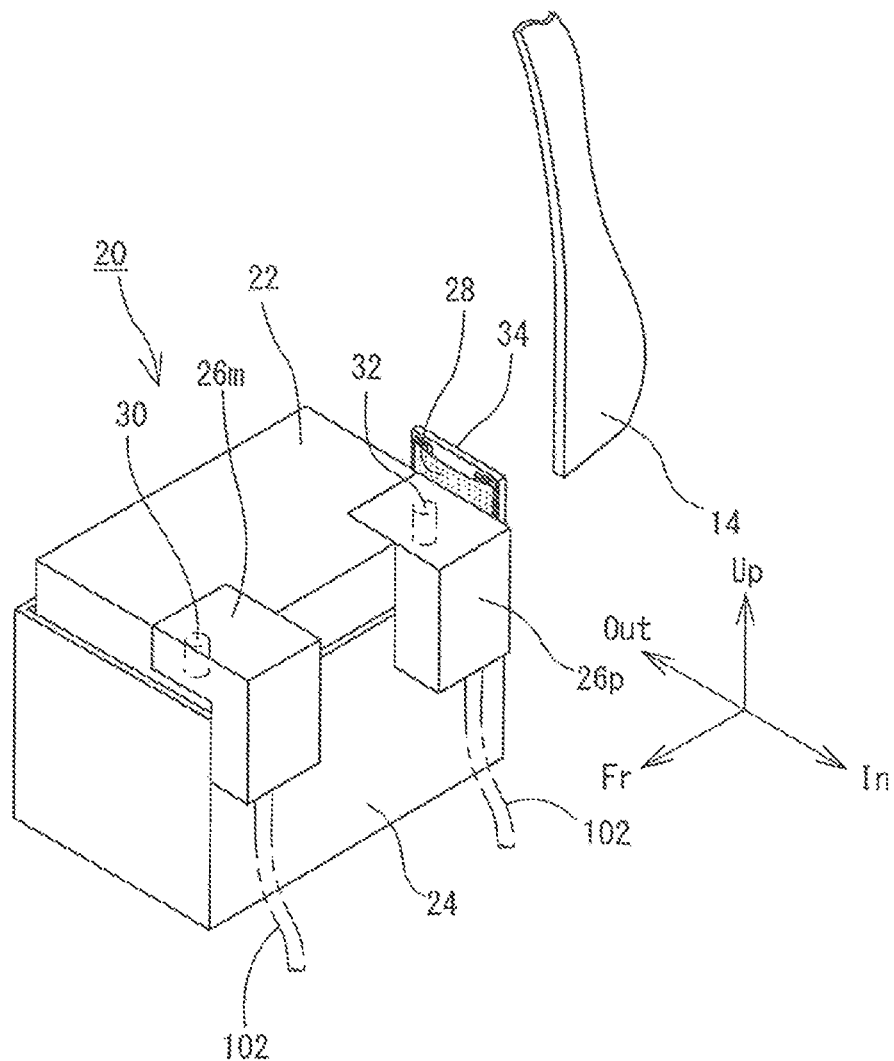
FIG. 3 is a schematic perspective diagram of a battery unit.
Figure 4:
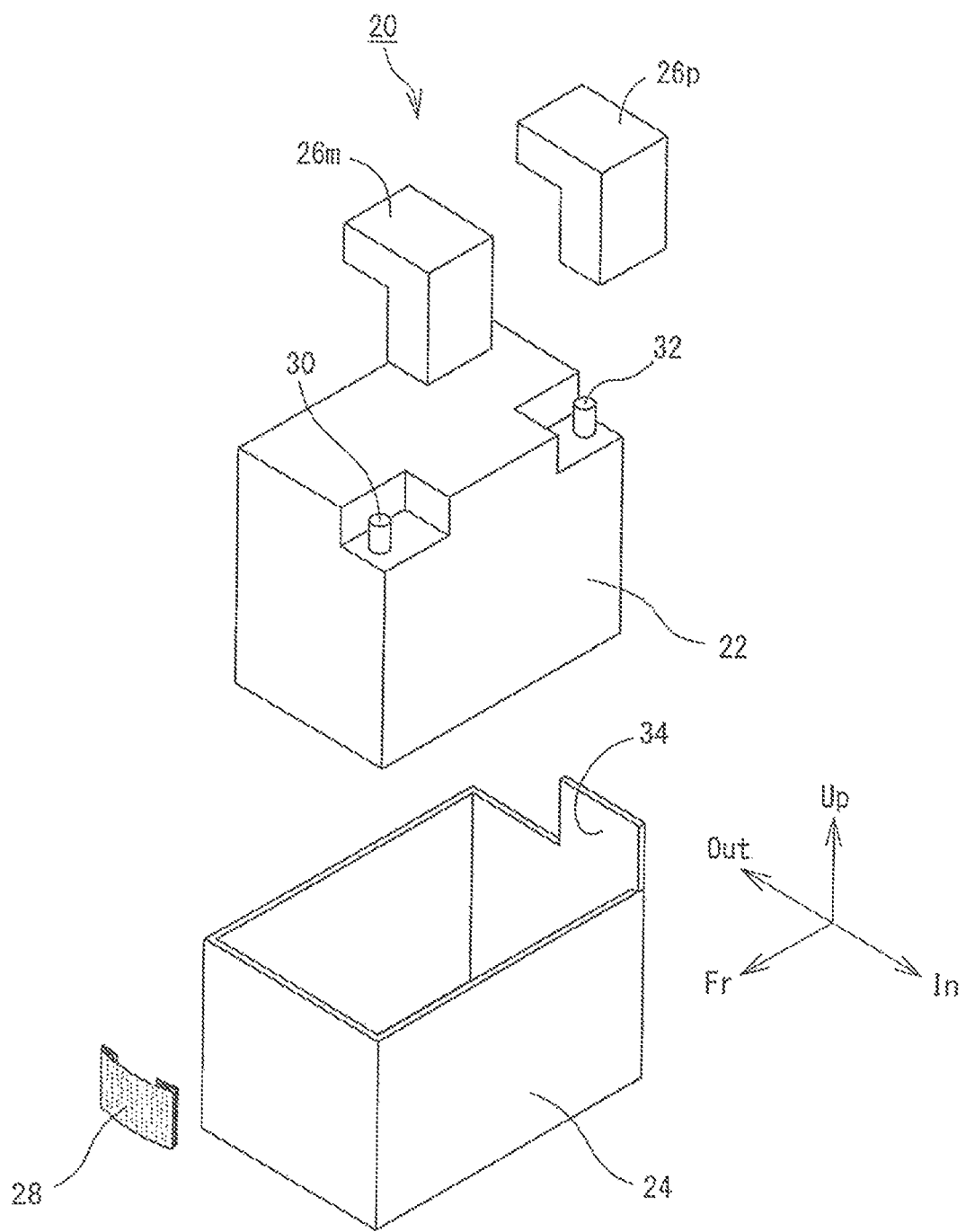
FIG. 4 is a schematic exploded perspective diagram of a battery unit.

Next, a structure of the battery unit 20 having the battery 22 as a primary element will be described with reference to FIGS. 3 and 4. FIG. 3 is a schematic perspective diagram of the battery unit 20, and FIG. 4 is a schematic exploded perspective diagram of the battery unit 20. The battery unit 20 includes the battery 22 having an approximate rectangular parallelepiped shape, the battery cover 24 which covers a periphery of the battery 22, and terminal covers 26m and 26p which protect the electric power terminals 30 and 32.

Of the battery 22, an upper front corner and an upper rear corner are cut out in an approximate rectangular parallelepiped shape, and a surface which is one stage lower than the periphery is formed. From this surface which is lower by a step, the negative electric power terminal 30 and the positive electric power terminal 32 protrude upward. Of these electric power terminals, the positive electric power terminal 32 corresponds to a first electric power terminal which protrudes upward near a rear end of the battery 22.

The electric power terminals 30 and 32 are protected by terminal covers 26m and 26p, respectively. The terminal covers 26m and 26p are made of an insulating material such as a resin. In addition, the shape of the terminal covers 26m and 26p is not particularly limited, so long as the terminal covers can cover the periphery of the electric power terminals 30 and 32. However, it is desirable that bottom surfaces of the terminal covers 26m and 26p are completely open, so as to allow extension of an electric power line 102 connected to the electric power terminal to the outside. When attached to the battery 22, ends of the terminal covers 26m and 26p extend significantly out of the battery 22, and the electric power lines 102 connected to the electric power terminals 30 and 32 extend from the bottom surfaces of the terminal covers 26m and 26p to the outside. When the battery is exchanged or charged, it is necessary to detach the terminal covers 26m and 26p and to expose the electric power terminals 30 and 32 to the outside. Thus, the terminal covers 26m and 26p are detachably attached to the battery 22.

The battery cover 24 is a member which covers the periphery (side surface) of the battery 22, and is made of an insulating material such as a resin. From a rear end edge of the battery cover 24, a protective wall 34 is provided in a standing manner. The protective wall 34 is positioned behind the positive electric power terminal 32, and an upper end of the protective wall 34 is higher than an upper end of the positive electric power terminal 32. In other words, the protective wall 34 is interposed between the flange 14 of the rear pillar 12 and the positive electric power terminal 32.

Of the protective wall 34, on a surface opposing the positive electric power terminal 32, an insulating sheet 28 is attached. The insulating sheet 28 is a sheet member made of an insulating material, and is, for example, a felt sheet, a nonwoven sheet or the like. Ends of the insulating sheet 28 are adhered and fixed to the protective wall 34. With this configuration, the insulating sheet 28 is interposed between the flange 14 of the rear pillar 12 and the positive electric power terminal 32.

The insulating sheet 28 is provided to prevent electrical contact (short-circuiting) between the flange 14 made of a metal and the positive electric power terminal 32. That is, normally, the flange 14 and the positive electric power terminal 32 are distanced from each other, but when the rear collision occurs wherein other members collide at the rear side of the vehicle, the flange 14 may move toward the front along with the rear pillar 12 due to the force of the collision. In this case, if the flange 14 collides with the positive electric power terminal 32, the short-circuiting occurs. While the positive electric power terminal 32 is protected by the terminal cover 26*p*, because the terminal cover 26*p* is detachably attached as described above, the terminal cover 26*p* may fall off even with a relatively small impact. As a result, during the rear collision, there has been a possibility of the terminal cover 26*p* falling off, and the positive electric power terminal 32 exposed to the outside contacting the flange 14, causing the short-circuiting.

In consideration of this, in the present example configuration, the insulating sheet 28 is placed between the flange 14 and the positive electric power terminal 32, to prevent short-circuiting of the flange 14 and the positive electric power terminal 32. Further, in order to prevent rupturing of the insulating sheet 28 when the flange 14 moves to the front, in the present example configuration, the insulating sheet 28 is configured such that the insulating sheet 28 may deform following movement of the flange 14 toward the positive electric power terminal 32.

Figure 5:
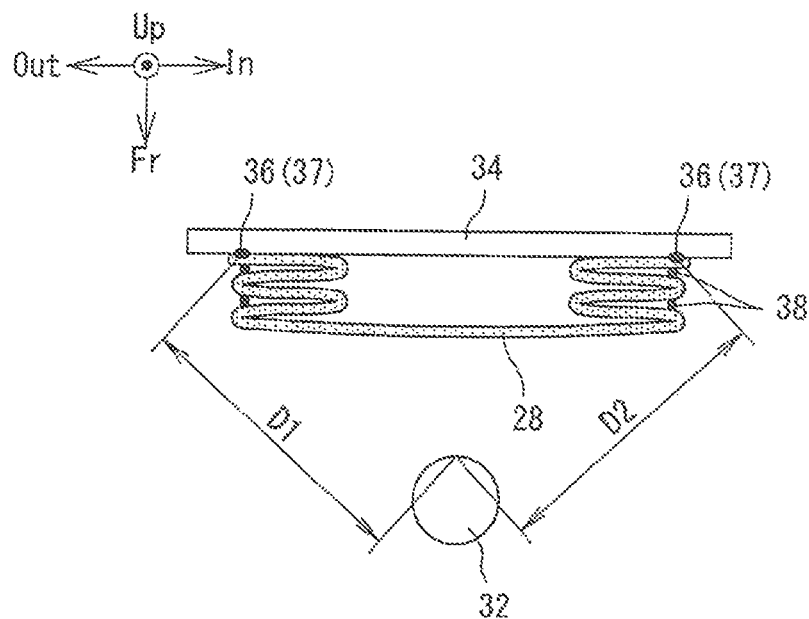
FIG. 5 is a schematic view of a positive electric power terminal, an insulating sheet, and a flange.
Figure 6:
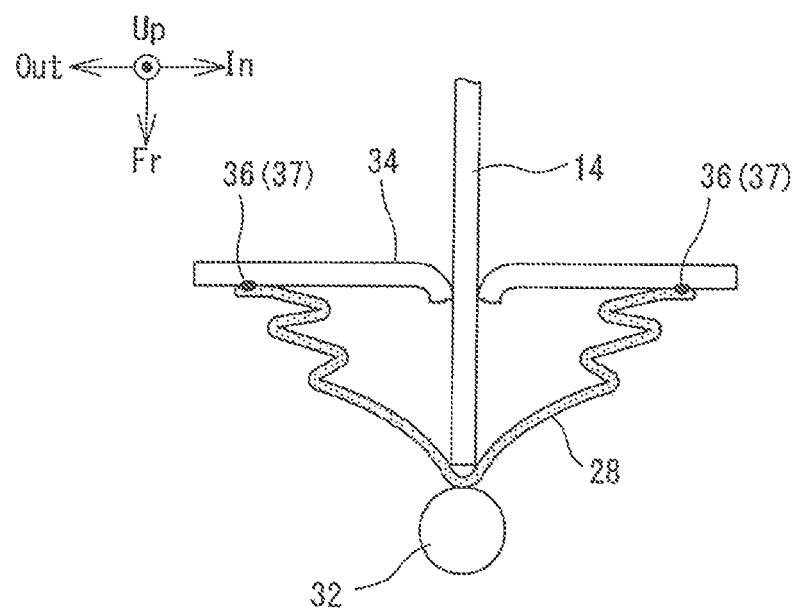
FIG. 6 is a schematic view of a positive electric power terminal, an insulating sheet, and a flange during a rear collision.

The deformation will now be described with reference to FIGS. 5 and 6. FIGS. 5 and 6 are schematic views of the insulating sheet 28, the positive electric power terminal 32, and the flange 14. In the present example configuration, the ends of the insulating sheet 28 are attached to the protective wall 34 by a firm, first adhesive 37. A fixation position by the first adhesive 37 is a support part 36 which supports the insulating sheet 28. In other words, a pair of support parts 36 distanced in the horizontal direction exist on the protective wall 34 (battery cover 24), and the insulating sheet 28 is supported by the pair of the support parts 36.

The insulating sheet 28 is attached to the protective wall 34 in a state where sides of the insulating sheet 28 are folded in a bellows shape. In other words, a distance along a surface from one end to the other end of the insulating sheet 28 is longer than a straight-line distance of the pair of the support parts 36, and the insulating sheet 28 is attached to the protective wall 34 in a state with a marginal length. Of the insulating sheet 28, the side portions have a multilayer structure in which a plurality of sheets are folded and overlapped, but a location facing the positive electric power terminal 32 has a single-layer structure in which sheets are not folded and overlapped.

Of the insulating sheet 28, the folded portion is temporarily fixed by a second adhesive 38 in order to maintain the folded state. An adhesion force of the second adhesive 38 is sufficiently smaller than the tensile strength of the insulting sheet 28, so that when the insulating sheet 28 is pulled to the front side, the temporary fixation by the second adhesive 38 is released before the insulating sheet 28 is ruptured. So long as the state of folding with a smaller force than the tensile strength of the insulating sheet 28 can be maintained, other fixation means may be employed in place of the second adhesive 38. For example, a string may be passed through a portion of the insulating sheet 28 where the sheet is folded and overlapped to form the multilayer structure, and the folded state may be maintained by a frictional force between the string and the insulating sheet 28.

In the above-described structure, when the rear collision of the vehicle occurs, and the flange 14 moves toward the positive electric power terminal 32, the flange 14 first collides with the protective wall 34. Because the protective wall 34 is made of the resin and is relatively soft, as shown in FIG. 6, the flange 14 penetrates and passes through the protective wall 34. The flange 14 passing through the protective wall 34 next collides with the insulating sheet 28. With this process, the insulating sheet 28 is pulled toward the front side of the vehicle, that is, toward the positive electric power terminal 32. With this pulling force, the temporary fixation by the second adhesive 38 is released, and the folding of the insulating sheet 28 is released. With this process, the insulating sheet 28 is put in a freely deformable state, and deforms following the flange 14 which moves toward the front side.

As a result, the insulating sheet 28 deforms to a state of being deflected toward the front side (toward the positive electric power terminal 32). At this point, because the insulating sheet 28 has a sufficient marginal length, a large pulling force is not applied to the insulating sheet 28, and rupturing of the insulating sheet 28 is prevented. As shown in FIG. 6, when the insulating sheet 28 reaches the positive electric power terminal 32 without being ruptured, the electric contact between the flange 14 and the positive electric power terminal 32 can be prevented.

In order to prevent the electric contact between the flange 14 and the positive electric power terminal 32, a configuration may be considered in which the insulating sheet 28 is attached to the flange 14, and not on the battery cover 24. However, it is difficult to accurately predict the movement of the flange 14 during the rear collision, and specifying the location of collision of the large flange 14 with the positive electric power terminal 32 is not possible. Thus, in order to reliably prevent electric contact between the flange 14 and the positive electric power terminal 32, the insulating sheet 28 must be attached over almost the entire surface of the flange 14, which results in a significant increase of the cost. On the other hand, if the insulating sheet 28 is provided on the battery cover 24, that is, near the positive electric power terminal 32, an area of the insulating sheet 28 can be suppressed, which results in a smaller increase of the cost.

In order to reliably prevent the short-circuiting, it is desirable that the insulating sheet 28 can reach the positive electric power terminal 32 without being ruptured. For this purpose, the distance along the surface of the insulating sheet 28 is desirably larger than a total distance (D1+D2) of a distance D1 from one support part 36 to the positive electric power terminal 32 and a distance D2 from the other support part 36 to the positive electric power terminal 32.

In any case, by interposing the insulating sheet 28 between the flange 14 and the positive electric power terminal 32 as in the present example configuration, the electric contact between the flange 14 and the positive electric power terminal 32 can be effectively prevented, and short-circuiting of these elements can be effectively prevented. The structure described above is merely exemplary, and so long as the insulating sheet 28 is interposed between the flange 14 and the positive electric power terminal 32, the other structures may be suitably changed.

For example, in the above description, the sides of the insulating sheet 28 are folded in the bellows shape in order to provide a marginal length for the insulating sheet 28, but a number of folds and a form of the folding may be suitably changed. Therefore, for example, a structure may be employed in which, of the insulating sheet 28, only one of left and right sides is folded.

Figure 7:
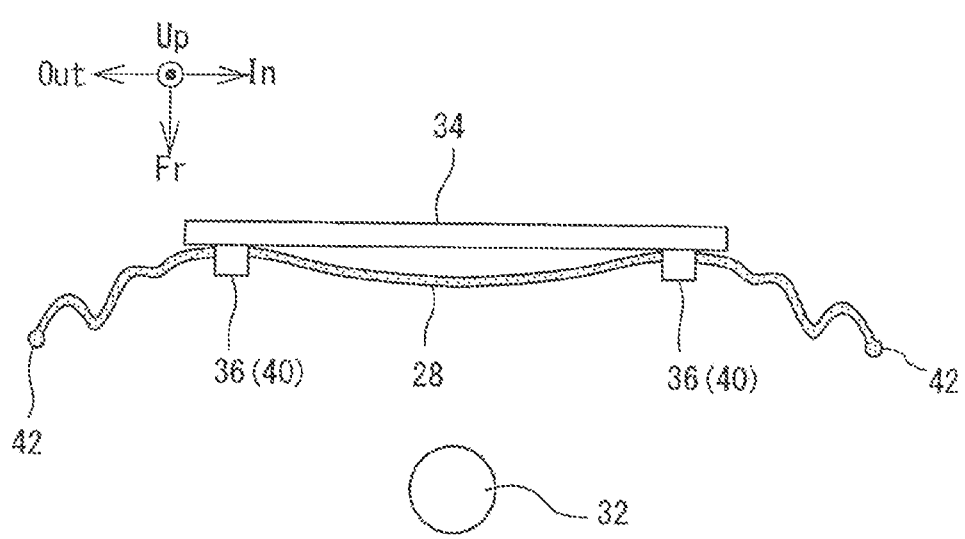
FIG. 7 is a schematic view showing another example placement of an insulating sheet.

Further, so long as the distance along the surface from the one end to the other end of the insulating sheet 28 is larger than the distance between the pair of the support parts 36, that is, so long as there is the marginal length, the insulating sheet 28 does not need to be folded. For example, as shown in FIG. 7, a pair of belt holes 40 which can support the insulating sheet 28 in a slidable manner may be provided, and the insulating sheet 28 having a band shape may be inserted into the belt hole 40. In this case, the belt hole 40 forms the support part 36. In this case, the insulating sheet 28 is inserted into a pair of the belt holes 40. Of the insulating sheet 28, the marginal length portion is hung on an outer side in the width direction from the belt hole 40. In order to prevent dropping off from the belt hole 40, expanded part 42 which is larger than a hole width of the belt hole 40, for example, a knot, may be provided on the ends of the insulating sheet 28.

In such a structure, when the insulating sheet 28 is pushed toward the front side (toward the positive electric power terminal 32) by the flange 14, the insulating sheet 28 is pulled toward the front side. In order to permit the pulling, the insulating sheet 28 slides along the belt hole 40. With this process, the insulating sheet 28 becomes deformable following the flange 14, and deforms to a state of being deflected toward the positive electric power terminal 32. Finally, when the insulating sheet 28 reaches the positive electric power terminal 32, the electric contact between the flange 14 and the positive electric power terminal 32 can be prevented. In FIG. 7, the two support parts 36 are both the belt holes 40. Alternatively, one of the two support parts 36 may be a support part 36 which supports the insulating sheet 28 in an immobile manner, for example, a firm adhesive.

In addition, in the above description, the marginal length is provided for the insulating sheet 28, but when there is a sufficient elasticity in the insulating sheet 28 itself, the marginal length does not need to be provided. For example, when the insulating sheet 28 is formed by a sufficiently elastic insulating material, for example, a rubber or the like, the insulating sheet 28 may be attached to the protective wall 34 without the marginal length. However, in any case, the insulating sheet 28 is desirably attached at a position and with a size such that an upper end of the insulating sheet 28 is higher than an upper end of the positive electric power terminal 32.

The invention claimed is:

1. A battery mounting structure for mounting a battery in a luggage space of a vehicle, comprising:
   a battery that is placed in the luggage space and that has a first electric power terminal which protrudes upward near a rear end of the battery;
   a battery cover that covers at least a part of the battery;
   a rear pillar that is placed at a boundary between a side surface and a back surface of the vehicle and that has a flange which protrudes to a front side; and
   an insulating sheet that is attached to the battery cover so as to be positioned between the first electric power terminal and the flange.

2. The battery mounting structure according to claim 1, wherein
   the insulating sheet can deflect in a direction toward a side of the first electric power terminal following a movement of the flange when the insulating sheet is pushed by the flange.

3. The battery mounting structure according to claim 1, wherein
   the battery cover comprises a pair of support parts distanced in a horizontal direction, and
   the insulating sheet is supported by the pair of the support parts in a state with a marginal length in which a distance along a surface from one end to the other end of the insulating sheet is longer than a straight-line distance between the pair of the support parts.

4. The battery mounting structure according to claim 3, wherein
   the distance along the surface from the one end to the other end of the insulating sheet is greater than or equal to a total distance of a distance from one of the support parts to the first electric power terminal and a distance from the other of the support parts to the first electric power terminal.

5. The battery mounting structure according to claim 3, wherein
   ends of the insulating sheet are fixed to the pair of the support parts in a state where a part of the insulating sheet is folded, and
   the folding of the insulating sheet is released and the insulating sheet can be opened to the side of the first electric power terminal when the insulating sheet is pushed to the side of the first electric power terminal.

6. The battery mounting structure according to claim 3, wherein
   at least one of the pair of the support parts supports the insulating sheet in a slidable manner,
   the insulating sheet is supported by the pair of the support parts in a state where a part of the insulating sheet is hung outside of the slidable support part, and
   the insulating sheet is deflected to the side of the first electric power terminal by the hung portion being slid when the insulating sheet is pushed to the side of the first electric power terminal.

7. The battery mounting structure according to claim 1, wherein
   an upper end of the insulating sheet is higher than an upper end of the first electric power terminal.

\* \* \* \* \*

UNITED STATES PATENT AND TRADEMARK OFFICE
CERTIFICATE OF CORRECTION

PATENT NO. : 10,763,476 B2
APPLICATION NO. : 16/432164
DATED : September 1, 2020
INVENTOR(S) : Taiki Kameyama It is certified that error appears in the above-identified patent and that said Letters Patent is hereby corrected as shown below:

On the Title Page

Item (72), Inventor, city, delete "Gamagori" and insert --Gamagori-shi, Aichi-ken--, therefor.

Signed and Sealed this
Fifth Day of January, 2021

Andrei Iancu
*Director of the United States Patent and Trademark Office*